(12) United States Patent
Anderson

(10) Patent No.: US 6,354,323 B1
(45) Date of Patent: Mar. 12, 2002

(54) LIQUID LEVEL CONTROLLER

(75) Inventor: R. David Anderson, Wichita Falls, TX (US)

(73) Assignee: Anderson Controls LC, Wichita Falls, TX (US)

( * ) Notice: Subject to any disclaimer, the term of this patent is extended or adjusted under 35 U.S.C. 154(b) by 0 days.

(21) Appl. No.: 09/695,956

(22) Filed: Oct. 25, 2000

(51) Int. Cl.⁷ .......................... F16K 43/00; F16K 31/34
(52) U.S. Cl. .................. 137/315.08; 137/413; 137/415; 137/416; 137/426; 137/445; 137/549
(58) Field of Search .............................. 137/82, 85, 86, 137/270, 412, 413, 414, 415, 416, 420, 426, 428, 434, 445, 315.08, 549; 251/25, 28

(56) References Cited

U.S. PATENT DOCUMENTS

| | | | | |
|---|---|---|---|---|
| 2,649,771 A | | 8/1953 | Parks .......................... 137/413 |
| 2,653,623 A | * | 9/1953 | Hippen et al. .............. 137/413 |
| 2,944,562 A | * | 7/1960 | Glasgow et al. ............ 137/414 |
| 3,052,254 A | * | 9/1962 | Parks ......................... 137/414 |
| 3,078,716 A | * | 2/1963 | Winters ...................... 137/413 |
| 3,120,241 A | * | 2/1964 | Parks ......................... 137/413 |
| 3,128,784 A | * | 4/1964 | Parks ......................... 137/413 |
| 3,840,044 A | * | 10/1974 | Harris et al. ................ 137/413 |
| 4,542,765 A | * | 9/1985 | Glasgow et al. ............ 137/414 |
| 4,543,973 A | * | 10/1985 | Ho .............................. 137/413 |
| 4,700,738 A | * | 10/1987 | Frese et al. ................. 137/412 |
| 5,992,448 A | | 11/1999 | Andeson et al. ............ 137/414 |

* cited by examiner

*Primary Examiner*—George L. Walton
(74) *Attorney, Agent, or Firm*—Bracewell & Patterson LLP

(57) ABSTRACT

An improved liquid level controller is shown having a pneumatic pilot assembly located outside the main controller housing. A filter housing is also located outside the main housing. The controller internal components include a torque bar acted upon by a displacement member, a lever and an adjustable connector for interconnecting the torque and lever. A biasing spring contacts the torque bar to balance the force exerted on the torque bar by the liquid displacement member. The pneumatic pilot is actuable by it movement of the lever to provide a selectable output for controlling a desired liquid level within the vessel interior.

6 Claims, 2 Drawing Sheets

LIQUID LEVEL CONTROLLER

BACKGROUND OF THE INVENTION

1. Technical Field

The present invention relates generally to fluid level sensing systems in which the level control is accomplished through the use of a displacement member whose motion is transmitted to a pneumatic or electric controller which is connected to a process valve, and specifically, to an improved pneumatic controller for such systems.

2. Description of the Related Art

The oil and gas, chemical and other industries utilize process valves for the control of process fluids which are operated by means of a pneumatic or electrical control signal. The controller for such valves typically includes a pilot valve whose function is to generate an output signal pressure which either opens or closes the process valve. In the typical prior art system, the level of liquid in the tank or other container is sensed with a displacement element or float that is in communication with the liquid in the container. The displacement element transmits a force or movement to the controller that is situated outside the container. The force or displacement so sensed is a measure of the change in liquid level.

For example, in the case of an oil and gas separator tank, a liquid level controller is provided which uses a float or displacement type sensor to transmit changes in the liquid level in the tank to a pilot valve outside the vessel. The pilot valve signals a process control or discharge valve in the discharge outlet from the vessel to open or close the discharge valve in response to the liquid level within the vessel.

Supply gas is generally taken from the production gas and routed to the pilot valve. When the liquid level in the vessel is within the desired limit, the supply gas is vented through the pilot valve to the atmosphere. When the liquid level rises sufficiently to change the position of the float, a flapper applies a force to the pilot valve so that the supply gas is diverted within the pilot valve to thereby provide a control signal to the discharge valve which allows liquid to flow from the vessel.

Many of the prior art liquid level controllers require right or left hand mounting which requires that both mountings be available in inventory. Also, their conversion between such mountings requires extensive reworking of the mounting and the components. It was often difficult to reach the internal components of such devices for repair and reconfiguration. Typically, the control systems were totally enclosed in a housing. The housing was required to be sealed to the atmosphere. Where a supply gas filter was present, it was generally difficult to access and clean as these steps required accessing the housing interior before access to the filter housing could be obtained. Also, the pressure gages were typically inside the housing and removal of the housing was required to service the gages. As a result, the components of the typical prior art pneumatic pilot level controller were not easily accessible or easily removed for maintenance or replacement In many cases, an adjustable biasing spring was used to balance the force exerted by the weight of the displacement element or float. The adjustable biasing spring was also enclosed within the housing in some cases, thereby making any adjustment of the biasing spring difficult and time consuming.

A need exists for a liquid level controller which can be easily and quickly accessed for adjustment or repair.

A need also exists for such a controller which features an externally mounted pilot assembly and filter assembly.

A need also exists for such a controller which features externally mounted pressure gauges which are oriented to accommodate either left or right hand mountings.

A need also exists for such a system that can enable adjustment of the biasing spring without having to remove the housing cover.

A need also exists for such a liquid level controller which is simple in design and economical to manufacture, which is dependable in operation and which features fewer parts than the prior designs.

SUMMARY OF THE INVENTION

It is therefore one object of the present invention to provide an improved liquid level controller which utilizes an easily adjustable spring counterbalance.

Another object of the invention is to provide a liquid level controller having an externally mounted pneumatic pilot and also having an externally mounted supply gas filter housing with an improved filter arrangement which facilitates maintenance or replacement of the filter element.

Another object of the invention is to provide a liquid level controller having an improved pressure gauge arrangement that facilitates viewing of the pressure gauges.

Another object of the present invention is to provide an improved liquid level controller which is simple in design, economical to manufacture and is dependable in operation.

The foregoing objects are achieved with the improved liquid level controller of the invention. The level controller of the invention has a pneumatic pilot assembly located outside the main housing. Because the pneumatic pilot assembly is outside the main housing, the component parts are easy to replace and repair. The filter housing is also located outside the main housing. The location of the filter housing facilitates maintenance or replacement of the filter element. An adjustment screw for the spring counterbalance is accessible without removal of the housing cover.

In a preferred embodiment, the improved liquid level controller of the invention includes a main housing having a plurality of walls which together define a normally enclosed interior, the main housing having a tubular connector body located on an exterior surface of a selected sidewall of the main housing. The connector body is connectable to a sidewall of a liquid containing vessel for communicating with an interior of the vessel.

A torque bar is located within the main housing closed interior. The torque bar is pivotally mounted therein by means of a torque shaft attached at a pivot end of the torque bar and extending generally perpendicular thereto. The torque shaft is supported by inner and outer bearing assemblies, the inner bearing assembly being located within a selected sidewall of the main housing and the outer bearing assembly being located within a sidewall of the connector body.

A displacement shaft has a first end connected to the torque shaft and extending perpendicular thereto. The displacement shaft also has a second end which extends through a bore provided within the tubular connector body to a liquid displacement member for transmitting vertical forces responsive to changes in liquid level as a force tending to rotate the torque shaft.

A lever is pivotally mounted within the main housing interior. An adjustable connector member interconnects the torque bar and lever for transmitting force exerted on the torque shaft to the lever. A biasing element located within the main housing interior contacts the torque bar to thereby balance force exerted on the torque bar by the liquid displacement member acting on the torque shaft.

A pilot assembly is located in a pilot housing which is mounted on the main housing and exterior thereto. The pilot assembly is actuable by movement of the lever to provide a selectable output for controlling a variable and desired liquid level within the vessel interior.

The foregoing objects of the invention, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
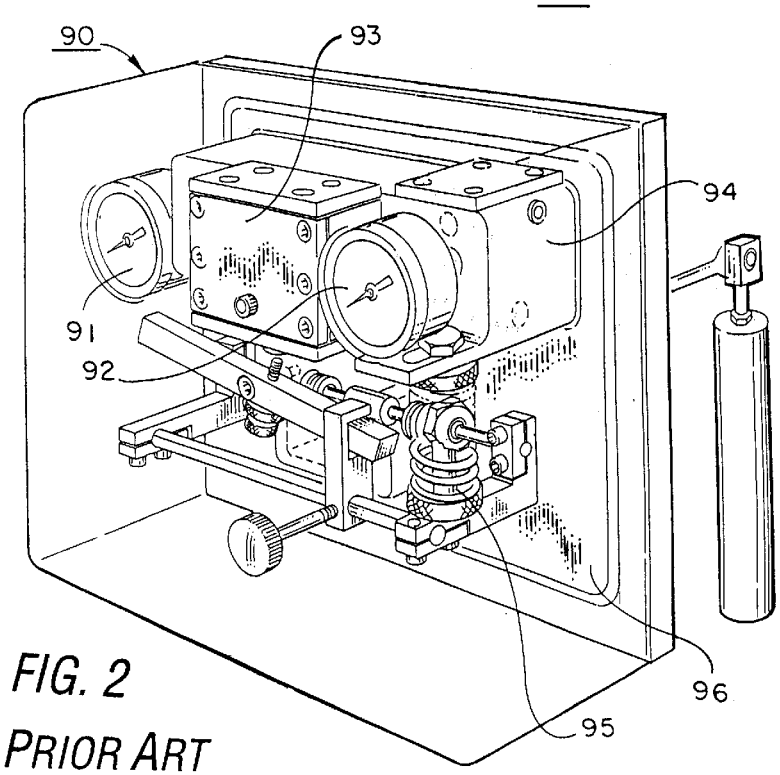
FIG. 2 is a perspective view of a prior art liquid level controller with the housing cover removed.

FIG. 2 shows a prior art liquid level controller 90 described generally in issued U.S. Pat. No. 5,992,448, and assigned to the assignee of the present invention. Liquid level controllers are described as "direct" and "throttling" in operation if an increase in level in the tank results in a proportional increase in outlet pressure from the controller. Controllers are described as "indirect and throttling" in operation if an increase in level within the tank resulted in a proportional decrease in outlet pressure from the controller. Controllers which operate in the "snap-on or snap-off" mode feature a sudden increase in output pressure with level increase in direct mode and a sudden decrease in output pressure with level increase for indirect operating mode. The controller 90 shown in U.S. Pat. No. 5,992,448 was easily converted between direct and indirect action and had a full range of sensitivity adjustment in both settings, among other features.

Despite these advantages, the pressure gauges 91, 92, pneumatic pilot 93, supply gas filter 94 and biasing spring 95 were all located within the interior 96 of the main housing of the device, requiring that the housing be accessed for maintenance, repair and adjustment operations. Also, some applications can accept a direct acting only controller which is simpler and less expensive in design and which features fewer component parts.

Figure 1:
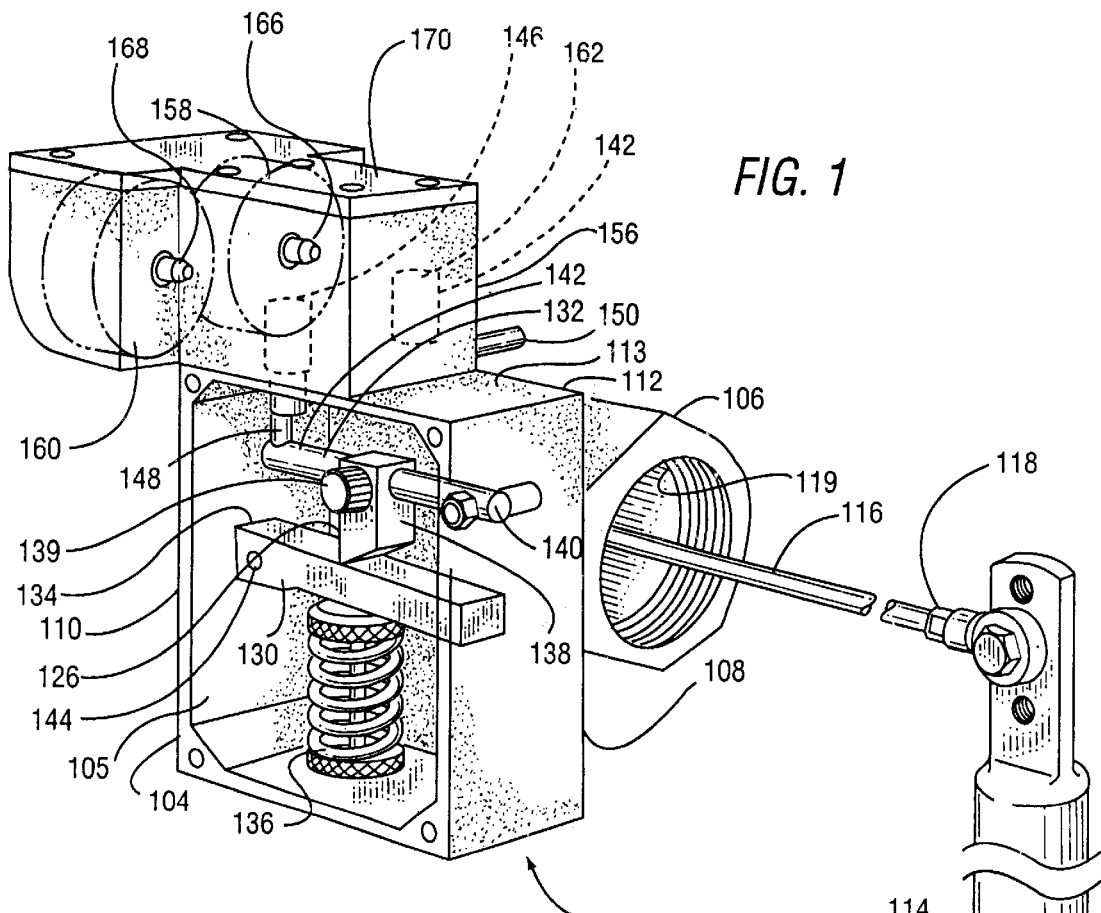
FIG. 1 is a side, perspective view of the liquid level controller of the present invention and with portions thereof broken away for ease of illustration.
Figure 3:
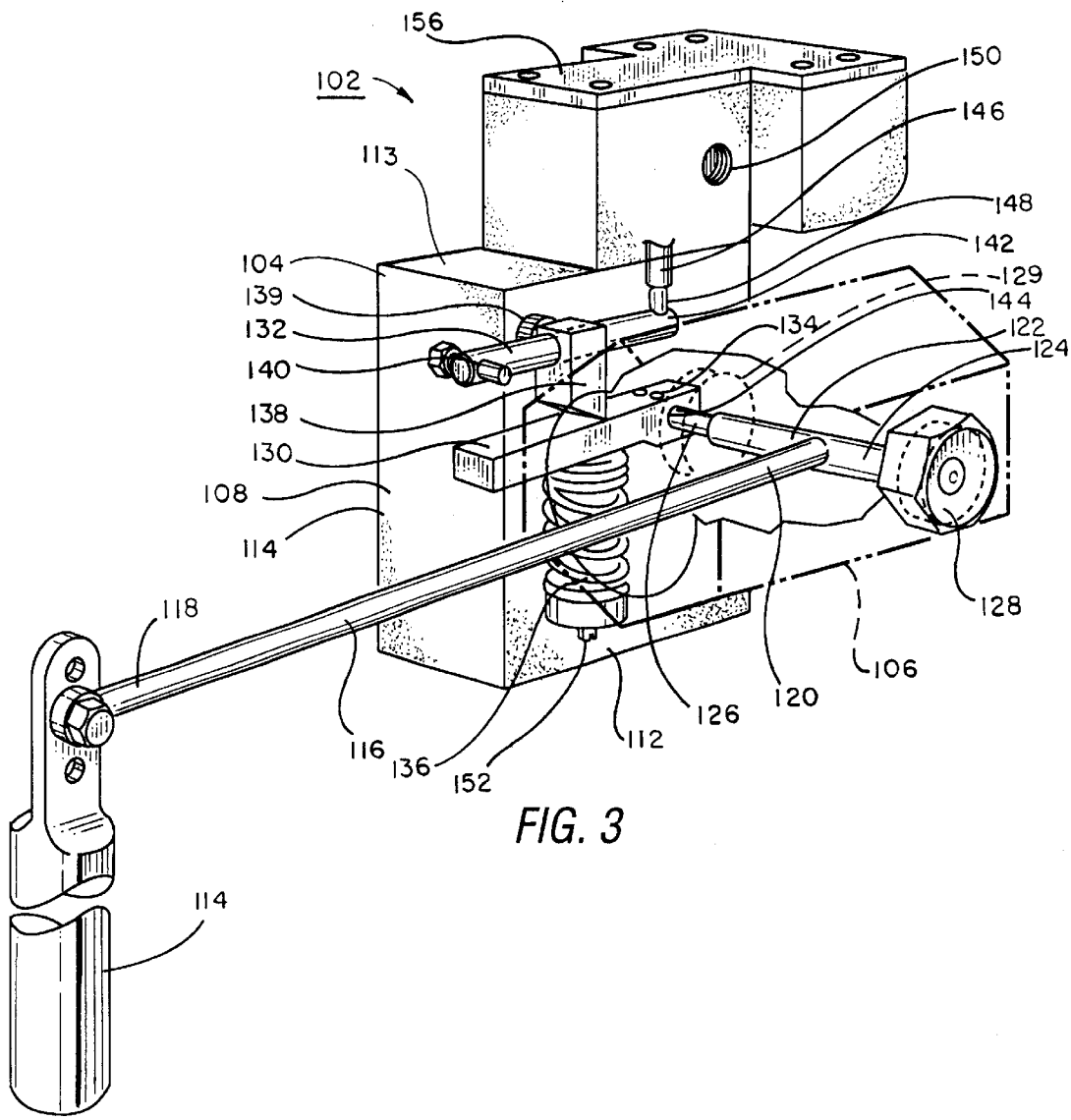
FIG. 3 is a rear perspective view of the liquid level controller of FIG. 1, again with portions thereof broken away for ease of illustration.

With reference now to the figures, and in particular with reference to FIG. 1, a liquid level controller 102 in accordance with a preferred embodiment of the present invention is illustrated. Controller 102 includes a main housing 104 formed by a plurality of sidewalls which define a normally closed interior 105. The main housing 104 has a rear wall 108, front wall 110, and opposing side walls 112, 114 (FIG. 3). A tubular connector body 106 is located on an exterior surface of a selected sidewall 112 of the main housing 104. The connector body 106 is connectable to a sidewall of a liquid containing vessel (not shown), such as an oil and gas separator tank for controlling the liquid level therein.

A torque bar 130 is located within the main housing closed interior 105. The torque bar 130 is pivotally mounted therein by means of a torque shaft 122 (FIG. 3) attached at a pivot end 134 of the torque bar and extending generally perpendicular thereto. The torque shaft 122 is supported by inner and outer bearing assemblies 128, 129. The inner bearing assembly 129 is located within a selected sidewall of the main housing 104 while the outer bearing assembly 128 is located within a sidewall of the tubular connector body 106. While the bearing assemblies are illustrated in FIG. 3 as hex nut assemblies, it will be understood that the bearings could simply be pressed into a cast piece without the need for a hex nut, if desired.

A displacement shaft 116 (FIG. 3) has a first end 120 connected to the torque shaft 122 at a point intermediate the inner and outer bearing assemblies 128, 129 and extending perpendicular thereto. The displacement shaft 116 has a second end 118 which extends through a bore 119 (FIG. 1) of the tubular connector body 106 to a liquid displacement member or float 114 for transmitting vertical forces responsive to changes in liquid level as a force tending to rotate the torque shaft 122.

A lever 132 (FIG. 3) is pivotally mounted to the side wall 112 of housing 104 at first end 140, and in a plane generally parallel to that of the torque bar 130. A suitable means is provided for interconnecting the torque bar 130 and the lever 132 for transmitting forces exerted on torque shaft 122 to the lever 132. In the embodiment illustrated in FIGS. 1 and 3, an adjustable connector 138 interconnects the torque bar and lever 132 for transmitting force exerted on the torque shaft 122 to the lever. Slight movement of torque bar 130 is transmitted through the adjustable connector to pneumatic pilot pin 148, whereby movement of lever 132 actuates pneumatic pilot 146. As best seen in FIG. 3, the second end 142 of lever 132 engages pilot pin 148 which extends into pneumatic pilot 146 to control the flow of instrument air and thus control the valve (not shown) that opens and closes flow of liquid form the vessel whose liquid level is to be controlled. In the preferred embodiment the adjustable connector 138 is a fulcrum member which is slidably mounted on the lever in engagement with the upper surface of torque bar 130. The lit position of the fulcrum member 138 on the lever 132 can be changed by loosening the adjustment screw 139.

A biasing element 136 (FIG. 1) is located within the main housing interior and contacts the torque bar 126 to thereby balance force exerted on the torque bar 126 by the liquid displacement member 114 acting on the torque shaft 122. In the embodiment of FIG. 1, the biasing element 136 is a coil spring located within the main housing interior and contacting a lower surface of the torque bar. The coil spring 136 has a characteristic coil tension which is adjustable by means of an adjustment screw, the head (152 in FIG. 3) of which is accessible from a location exterior of the main housing.

The pneumatic pilot (shown in dotted lines as 146 in FIG. 3) is a part of the valving assembly of the liquid level controller which includes a supply of control gas, an output of gas and means for interconnecting and interrupting the flow of control gas from the supply to the output. The supply gas is also filtered prior to entering the pneumatic pilot. In the example shown, a filter assembly or housing 156 (FIG. 3) is mounted on the top wall 113 of housing 104 external thereto and supports a supply pressure gauge 158. An output pressure gauge 160 is also mounted on the it filter housing 156. An inlet port 150 communicates with any convenient source of supply gas pressure. A cylindrical filter element 162 (FIG. 1) is mounted within the filter housing 156 whereby flow from the inlet port 150 is through the open cylindrical interior 164 of the cylindrical filter element 162 and then outwardly through a pair of output ports. A first output port 166 (FIG. 1) conducts filtered supply gas pressure to the supply pressure gauge 158. Since the filter element 162 is located upstream of the supply pressure gauge 158, a dirty or blocked filter element is easily detected by means of a drop in supply pressure at the gauge 158. A second output port 168 communicates with the pneumatic pilot 146 by means of a supply gas passage (not shown).

The filter element 162, in the embodiment shown, is a 40 micron polyurethane type element approximately one inch in diameter and one inch in length. The filter is conveniently received within the housing 156 by means of lid 170 which is held in place by allen screws 172. The lid 170 also allows access to the pneumatic pilot 146 for maintenance or replacement.

The pneumatic pilot assembly 146 can be any of a number of pilot assemblies known in the art. For example, the pilot assembly could be as described in one or more of the following issued U.S. Pat. Nos. 2,649,771; 3,171,267; 4,875,502; 5,992,448.

An invention has been provided with several advantages. Because of the outside mounted position of both the filter element 162 and the pneumatic pilot 146, both components of the level controller are easily accessible and are easily removed for maintenance or replacement. Because flow through the filter element 162 is from the inside thereof to the outside, cleaning is facilitated if a replacement filter is not immediately available. Adjustable biasing spring 136 is positioned such that head 152 of adjustable biasing spring 136 can be accessed without removal of housing 104. Because head 152 can be adjusted without the removal 16 of housing 104, any adjustment to the biasing means can be done quickly and easily. The externally mounted pressure gauges are oriented to accommodate either left or right hand mounting. The liquid level controller of the invention can thus be easily accessed for adjustment or repair. The controller is simple in design, economical to manufacture and extremely dependable in operation having fewer parts than prior designs.

What is claimed is:

1. An improved liquid level controller, comprising:

a main housing having a plurality of walls which together define a normally enclosed interior, the main housing having a connector body located on an exterior surface of a selected sidewall of the main housing, the connector body being connectable to a sidewall of a liquid containing vessel for communicating with an interior of the vessel;

a torque bar located within the main housing closed interior, the torque bar being pivotally mounted therein by means of a torque shaft attached at a pivot end of the torque bar and extending generally perpendicular thereto, the torque shaft being supported by inner and outer bearing assemblies, the inner bearing assembly being located within a selected sidewall of the main housing and the outer bearing assembly being located within a sidewall of the connector body;

a displacement shaft having a first end connected to the torque shaft and extending perpendicular thereto, the displacement shaft having a second end which extends through a bore provided within the tubular connector body to a liquid displacement member for transmitting vertical forces responsive to changes in liquid level as a force tending to rotate the torque shaft;

a lever pivotally mounted within the main housing interior;

an adjustable connector member interconnecting the torque bar and lever for transmitting force exerted on the torque shaft to the lever;

a biasing element located within the main housing interior and contacting the torque bar to thereby balance force exerted on the torque bar by the liquid displacement member acting on the torque shaft, wherein the biasing element is a coil spring located within the main housing interior and contacting a lower surface of the torque bar, the coil spring having a coil tension which is adjustable by means of an adjustment screw which is accessible from a located exterior of the main housing;

a pilot assembly located in a pilot housing which is mounted on the main housing and exterior thereto, the pilot assembly being actuable by movement of the lever to provide a selectable output for controlling a variable and desired liquid level within the vessel interior.

2. The liquid level controller of claim 1, wherein the connector member which connects the torque bar and lever is slidably mounted on the lever for movement along the length thereof.

3. The liquid level controller of claim 1, further comprising:

a supply pressure gauge and an output pressure gauge mounted to the pilot housing exterior to the main housing; and a supply of control gas fluidly connected to the supply pressure gauge, the control gas being communicated by fluid passages with the pilot assembly and, in turn, with the output pressure gauge.

4. The liquid level controller of claim 3, wherein a filter housing and filter element are located upstream of the pilot assembly exterior of the main housing, the filter housing having a lid to allow access to the filter element for cleaning and replacement.

5. An improved liquid level controller, comprising:

a main housing having opposing side walls, a top wall and a bottom wall which together define a normally enclosed interior, the main housing having a tubular connector body located on an exterior surface of a selected sidewall of the main housing, the connector body being connectable to a sidewall of a liquid containing vessel for communicating with an interior of the vessel;

a torque bar located within the main housing closed interior, the torque bar being pivotally mounted therein by means of a torque shaft attached at a pivot end of the torque bar and extending generally perpendicular thereto, the torque shaft being supported by inner and outer bearing assemblies, the inner bearing assembly being located within a selected sidewall of the main housing and the outer bearing assembly being located within a sidewall of the tubular connector body located on the main housing exterior;

a displacement shaft having a first end connected to the torque shaft at a point intermediate the inner and outer bearing assemblies and extending perpendicular thereto, the displacement shaft having a second end which extends through a bore provided within the tubular connector body to a liquid displacement member for transmitting vertical forces responsive to changes in liquid level as a force tending to rotate the torque shaft;

a lever pivotally mounted within the main housing interior in a plane generally parallel to that of the torque bar;

an adjustable connector member interconnecting the torque bar and lever for transmitting force exerted on the torque shaft to the lever;

a biasing element located within the main housing interior and contacting the torque bar to thereby balance force exerted on the torque bar by the liquid displacement member acting on the torque shaft, wherein the biasing element is a coil spring located within the main housing interior and contacting a lower surface of the torque bar, the coil spring having a coil tension which is adjustable by means of an adjustment screw which is accessible from a location exterior of the main housing;

a pneumatic pilot assembly located in a pilot housing which is mounted on the main housing and exterior thereto, the pneumatic pilot assembly being actuable by movement of the lever to provide a selectable output for controlling a variable and desired liquid level which is a function of a selected position of the adjustable connector relative to the torque bar and the lever;

a supply pressure gauge and an output pressure gauge mounted to the pilot housing exterior to the main housing;

a supply of control gas fluidly connected to the supply pressure gauge, the control gas being communicated by fluid passages with the pilot assembly and, in turn, with the output pressure gauge; and wherein a filter housing and filter element are located upstream of the pilot assembly exterior of the main housing, the filter housing having a lid to allow access to the filter element for cleaning and replacement.

6. The liquid level controller of claim 5, wherein the connector member which connects the torque bar and lever is slidably mounted on the lever for movement along the length thereof.

* * * * *